(12) United States Patent
Takada et al.

(10) Patent No.: US 9,211,497 B2
(45) Date of Patent: Dec. 15, 2015

(54) ASYMMETRIC GAS SEPARATION MEMBRANE AND METHOD FOR SEPARATING METHANOL FROM MIXED ORGANIC VAPOR USING THE SAME

(75) Inventors: Ryoichi Takada, Ichihara (JP);
Harutoshi Hoshino, Ichihara (JP);
Tomonori Kanougi, Ichihara (JP);
Toshimune Yoshinaga, Ichihara (JP);
Kenji Fukunaga, Ichihara (JP)

(73) Assignee: UBE INDUSTRIES, LTD., Ube-Shi (JP)

( * ) Notice: Subject to any disclaimer, the term of this patent is extended or adjusted under 35 U.S.C. 154(b) by 65 days.

(21) Appl. No.: 13/992,600

(22) PCT Filed: Dec. 9, 2011

(86) PCT No.: PCT/JP2011/078621
§ 371 (c)(1),
(2), (4) Date: Aug. 20, 2013

(87) PCT Pub. No.: WO2012/077810
PCT Pub. Date: Jun. 14, 2012

(65) Prior Publication Data
US 2013/0319229 A1    Dec. 5, 2013

(30) Foreign Application Priority Data

Dec. 9, 2010  (JP) ................................. 2010-274273

(51) Int. Cl.
*B01D 53/22*    (2006.01)
*B01D 71/64*    (2006.01)
(Continued)

(52) U.S. Cl.
CPC .............. *B01D 53/228* (2013.01); *B01D 53/22* (2013.01); *B01D 53/72* (2013.01); *B01D 69/02* (2013.01);
(Continued)

(58) Field of Classification Search
CPC ...... B01D 53/228; B01D 71/64; B01D 53/22; B01D 53/72; B01D 69/02; B01D 68/08; B01D 69/12; B01D 2257/704; B01D 2325/20; C08L 79/08
USPC .................. 95/45, 50; 96/4, 8, 10, 11, 13, 14; 528/185
See application file for complete search history.

(56) References Cited

U.S. PATENT DOCUMENTS 3,822,202 A * 7/1974 Hoehn ................................. 96/4
4,440,643 A * 4/1984 Makino et al. ..................... 96/10
(Continued)

FOREIGN PATENT DOCUMENTS

JP    A-S63-175115    7/1988
JP    4-16213    * 1/1992    ............. B01D 53/22
(Continued)

OTHER PUBLICATIONS

International Preliminary Report on Patentability mailed on Jun. 20, 2013 for International Application No. PCT/JP2011/078621.

*Primary Examiner* — Jason M Greene
(74) *Attorney, Agent, or Firm* — Knobbe, Martens, Olson & Bear, LLP

(57) ABSTRACT

An asymmetric gas separation membrane made of an aromatic polyimide mainly containing repeating units having an ether bond which is heated at a temperature near a softening point ($T_s$) of the aromatic polyimide, and a method for separating methanol from a methanol-containing mixed organic vapor by allowing methanol to selectively permeate the asymmetric gas separation membrane using the membrane.

5 Claims, 1 Drawing Sheet

(51) Int. Cl.
  *B01D 53/72* (2006.01)
  *B01D 69/02* (2006.01)
  *B01D 69/08* (2006.01)
  *C08L 79/08* (2006.01)
(52) U.S. Cl.
  CPC ............... *B01D 69/08* (2013.01); *B01D 71/64* (2013.01); *C08L 79/08* (2013.01); *B01D 2257/704* (2013.01); *B01D 2325/20* (2013.01)

(56) References Cited

U.S. PATENT DOCUMENTS

| | | | | |
|---|---|---|---|---|
| 5,262,056 | A | * | 11/1993 | Koros et al. .................. 210/654 |
| 5,753,008 | A | * | 5/1998 | Friesen et al. .................... 95/45 |
| 7,604,746 | B2 | * | 10/2009 | Childs et al. .................. 210/640 |
| 2006/0196355 | A1 | * | 9/2006 | Ekiner et al. ...................... 95/45 |
| 2008/0134885 | A1 | * | 6/2008 | Yoshinaga et al. ................. 95/47 |
| 2011/0000367 | A1 | * | 1/2011 | Kanougi et al. ................... 95/52 |
| 2011/0048229 | A1 | * | 3/2011 | Hoshino et al. ................... 95/50 |

FOREIGN PATENT DOCUMENTS

| | | | | |
|---|---|---|---|---|
| JP | A-H04-16213 | | 1/1992 | |
| JP | 2004-267810 | * | 9/2004 | ............ B01D 71/64 |
| JP | A-2004-267810 | | 9/2004 | |
| WO | WO 2009/099109 A1 | * | 8/2009 | ............ B01D 71/64 |

* cited by examiner

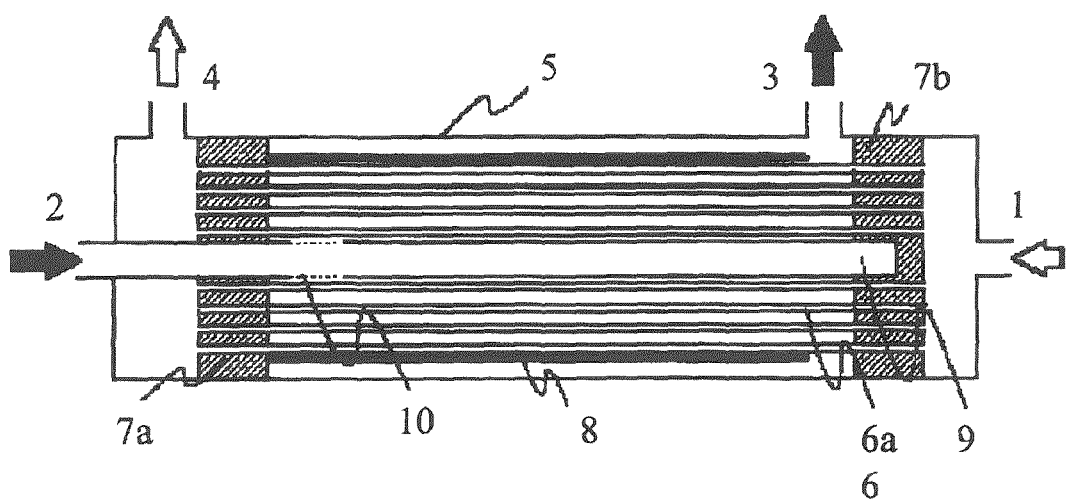

ASYMMETRIC GAS SEPARATION MEMBRANE AND METHOD FOR SEPARATING METHANOL FROM MIXED ORGANIC VAPOR USING THE SAME

This application is the U.S. National Phase under 35 U.S.C. §371 of International Application No. PCT/JP2011/078621, filed Dec. 9, 2011, designating the U.S., and published in Japanese as WO 2012/077810 on Jun. 14, 2012, which claims priority to Japanese Patent Application No. 2010-274273 filed Dec. 9, 2010, the entire content of which is incorporated herein by reference.

TECHNICAL FIELD

The present invention relates to an asymmetric gas separation membrane allowing for selective permeation of methanol from a methanol-containing mixed organic vapor. In particular, it relates to an asymmetric gas separation membrane made of an aromatic polyimide containing repeating units having an ether bond which has improved solvent resistance to an organic solvent by heating at a temperature near a softening point of the polyimide and has practically viable separation performance for a methanol-containing mixed organic vapor. The present invention also relates to a method for separating methanol from a methanol-containing mixed organic vapor using the asymmetric gas separation membrane.

BACKGROUND ART

Distillation has been generally employed for separating methanol from a methanol-containing organic mixture solution. However, a common distillation method has the problem that it requires an enormous amount of thermal energy during vaporizing a solution for separation in a distillation column. Furthermore, in the case of separating an azeotropic mixture which is inseparable by the common distillation method or a mixture of organic materials having close boiling points, an azeotropic distillation method containing very complicated many steps or extractive distillation method must be employed.

Recently, as a method for separating an organic mixture solution which is different from a conventional distillation separation method, there has been proposed a method wherein an organic mixture solution is vaporized and the vapor is fed to the feeding side of a gas separation membrane while allowing a particular organic component to selectively permeate toward the permeate side of the gas separation membrane.

For separation of a mixed organic vapor using a polyimide asymmetric gas separation membrane, Patent Reference No. 1 has described a method for separating a lower alcohol using a gas separation membrane made of a heat-resistant aromatic polymer. Patent Reference No. 1 has described separation of a mixed vapor containing methanol and methyl t-butyl ether or that containing methanol and toluene using an asymmetric hollow fiber membrane for gas separation, which is produced by heating a polyimide made of biphenyltetracarboxylic acid, diaminodiphenyl ether and di(aminophenoxy)benzene (which is identical to bis(aminophenoxy)benzene) at 160° C.

CITATION LIST

Patent Reference

Patent Reference No. 1: Japanese Laid-open Patent Publication No. H04(1992)-016213.

SUMMARY OF INVENTION

Problems to be Solved by the Invention

However, when the methanol separation method described in Patent Reference No. 1 is actually used, methanol cannot be consistently separated for a long period although methanol permeation performance is satisfactory in an initial separation stage, due to insufficient solvent resistance of the asymmetric membrane.

To solve the above problems, an object of the present invention is to provide an asymmetric gas separation membrane having improved solvent resistance to an organic solvent and exhibiting practically viable separation performance for a mixed organic vapor. Another object of the present invention is to provide a method for consistently separating methanol from a methanol-containing mixed organic vapor for a long period.

Means for Solving the Problems

The present invention relates to an asymmetric gas separation membrane made of an aromatic polyimide mainly containing repeating units having an ether bond which is heated at a temperature near a softening point ($T_s$) of the aromatic polyimide, and a method for separating methanol from a methanol-containing mixed organic vapor by allowing methanol to selectively permeate the asymmetric gas separation membrane using the membrane. Specifically, the present invention relates to the followings.

[1] An asymmetric gas separation membrane produced by heating an asymmetric gas separation membrane made of a polyimide substantially consisting of repeating units represented by the following general formula (1) at a temperature $T_{tr}$ within the range:

$$(T_s - 23°\ C.) < T_{tr} < (T_s - 2°\ C.)$$

wherein $T_{tr}$ represents a heating temperature and $T_s$ represents a softening point of the polyimide constituting the asymmetric gas separation membrane;

wherein a permeation rate of methanol vapor ($P'_{MeOH}$) is $4 \times 10^{-5}$ cm$^3$ (STP)/cm$^2$·sec·cmHg or more and a ratio of a permeation rate of methanol vapor to a permeation rate of dimethyl carbonate vapor ($P'_{MeOH}/P'_{DMC}$) is 8 or more:

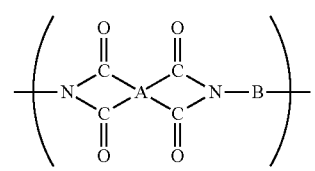

General formula (1)

wherein in general formula (1), A represents a tetravalent residue having an aromatic ring, and in general formula (1), B mainly represents a divalent residue represented by the following chemical formula (B1) and/or a divalent residue represented by the following chemical formula (B2):

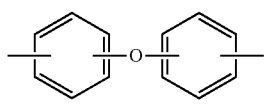
Chemical formula (B1)

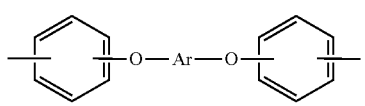
Chemical formula (B2)

wherein in chemical formula (B2), Ar represents one or more divalent residues selected from the group consisting of the residues represented by chemical formulas (Ar1) to (Ar6).

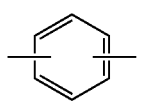
Chemical formula (Ar1)

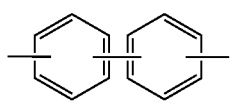
Chemical formula (Ar2)

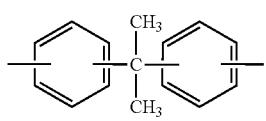
Chemical formula (Ar3)

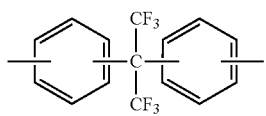
Chemical formula (Ar4)

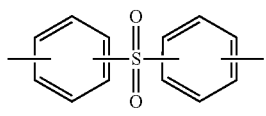
Chemical formula (Ar5)

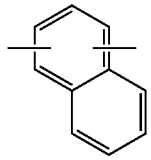
Chemical formula (Ar6)

[2] The asymmetric gas separation membrane as described in [1], wherein 60 to 100 mol % of the tetravalent residue having an aromatic ring represented by A in general formula (1) is a tetravalent residue based on a biphenyl structure represented by chemical formula (A1).

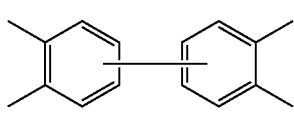
Chemical formula (A1)

[3] The asymmetric gas separation membrane as described in [1] or [2], constituting a hollow fiber membrane.

[4] A process for manufacturing an asymmetric gas separation membrane, comprising heating an asymmetric gas separation membrane made of a polyimide having repeating units represented by the general formula (1) at a temperature of $T_{tr}$ within the range:

$$(T_s-23°\text{ C.}) < T_{tr} < (T_s-2°\text{ C.})$$

wherein $T_{tr}$ represents a heating temperature and $T_s$ represents a softening point of the polyimide constituting the asymmetric gas separation membrane.

[5] A process for separating methanol from a methanol-containing mixed organic vapor using the asymmetric gas separation membrane as described in any one of [1] to [3].

[6] A process for separating methanol from a methanol-containing mixed organic vapor, comprising:
heating a methanol-containing mixed organic solvent at a temperature of 110° C. or more and. 250° C. or less and a pressure of 0 MPaG or more and 0.3 MPaG or less to generate a mixed organic vapor; and
making said mixed organic vapor contact with the asymmetric gas separation membrane as described in any one of [1] to [3], allowing methanol vapor to selectively permeate said asymmetric gas separation membrane.

[7] The process as described in [5] or [6], wherein said mixed organic vapor comprises methanol and dimethyl carbonate.

Effect of the Invention

According to the present invention, by heating an asymmetric gas separation membrane, can be provided an asymmetric gas separation membrane having improved solvent resistance to an organic solvent and practically stable separation performance for an organic vapor. Furthermore, there can be provided a process for consistently separating methanol from a methanol-containing mixed organic vapor for a long period using an asymmetric gas separation membrane of the present invention.

BRIEF DESCRIPTION OF THE DRAWINGS

FIG. 1 schematically shows an exemplary gas separation membrane module for separation of an organic vapor.

DESCRIPTION OF EMBODIMENTS

First, an asymmetric gas separation membrane of the present invention will be described. An asymmetric gas separation membrane of the present invention is made of an aromatic polyimide substantially consisting of repeating units represented by the following general formula (1).

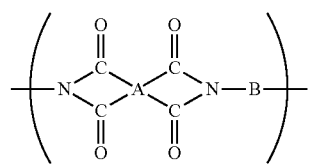
General formula (1)

wherein in general formula (1), A represents a tetravalent residue having an aromatic ring, and
in general formula (1), B mainly represents a divalent residue represented by the following chemical formula (B1) and/or a divalent residue represented by the following chemical formula (B2):

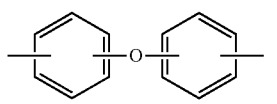
Chemical formula (B1)

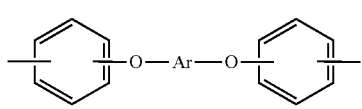
Chemical formula (B2)

wherein in chemical formula (B2), Ar represents one or more divalent residues selected from the group consisting of the structures represented by the following chemical formulas (Ar1) to (Ar6).

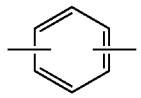
Chemical formula (Ar1)

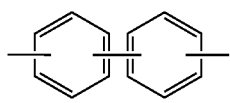
Chemical formula (Ar2)

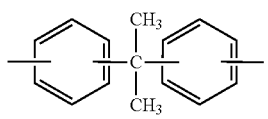
Chemical formula (Ar3)

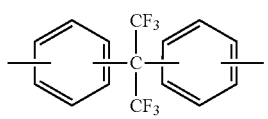
Chemical formula (Ar4)

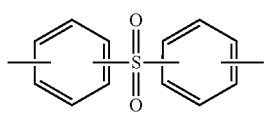
Chemical formula (Ar5)

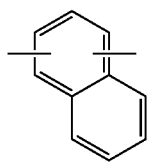
Chemical formula (Ar6)

An aromatic polyimide substantially consisting of repeating units represented by the general formula (1) which constitutes an asymmetric gas separation membrane of the present invention can be produced by polymerizing/imidizing an aromatic tetracarboxylic acid component mainly containing aromatic tetracarboxylic acids (hereinafter, sometimes referred to as "tetracarboxylic acid component") and an aromatic diamine component as a diamine having a plurality of aromatic rings (hereinafter, sometimes referred to as "diamine component") in an organic solvent such as a phenolic compound.

The aromatic tetracarboxylic acid component described above is a component by which a tetravalent residue A can be introduced into a polyimide consisting of the repeating unit represented by general formula (1). Specific examples include a tetracarboxylic dianhydride, a tetracarboxylic acid and a tetracarboxylte ester. In the present invention, an aromatic tetracarboxylic acid component comprises a biphenyl tetracarboxylic acid by which a tetravalent residue A1 based on the biphenyl structure represented by chemical formula (A1) can be introduced, preferably in 60 mol % or more and 100 mol % or less, more preferably in 70 mol % or more and 100 mol % or less, further preferably in 90 mol % or more and 100 mol % or less. If a content of the biphenyl tetracarboxylic acid is less than 60 mol %, the asymmetric gas separation membrane swells when the membrane is made in contact with a mixed organic vapor containing methanol and dimethyl carbonate, leading to insufficient separation.

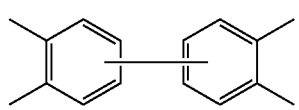
Chemical formula (A1)

Examples of a biphenyl tetracarboxylic acid capable of introducing a tetravalent residue A1 based on a biphenyl structure represented by chemical formula (A1) include 3,3',4,4'-biphenyl tetracarboxylic acids, 2,3,3',4'-biphenyl tetracarboxylic acids and 2,2',3,3'-biphenyl tetracarboxylic acids and their dianhydrides or esters. Among these, 3,3',4,4'-biphenyl tetracarboxylic acids are preferable, and 3,3',4,4'-biphenyl tetracarboxylic acid dianhydrides are particularly preferable.

In addition to the above biphenyl tetracarboxylic acids, the aromatic tetracarboxylic acid component may comprise pyromellitic acid, benzophenone tetracarboxylic acid, diphenyl ether tetracarboxylic acid, 2,2-bis(dicarboxyphenyl)propane, 2,2-bis(dicarboxyphenyl)hexafluoropropane, 2,2-bis[(dicarboxyphenoxy)phenyl]propane, 2,2-bis[(dicarboxyphenoxy)phenyl]hexafluoropropane, or a dianhydride or ester thereof, in an amount of 40 mol % or less of the aromatic tetracarboxylic acid component.

The above aromatic diamine component is a component capable of introducing a divalent residue B into a polyimide consisting of repeating units represented by general formula (1). In the present invention, a diamine component is a component capable of introducing a divalent residue B1 mainly based on the structure represented by chemical formula (B1) and/or a divalent residue B2 based on the structure represented by chemical formula (B2). In the present invention, a diamine component preferably comprises a diamine capable of introducing a residue B1 and/or a residue B2, in 90 mol % or more and 100 mol % or less. In general formula (1), it is preferable that a divalent residue B1 accounts for preferably 100 to 10 mol %, more preferably 90 to 10 mol %, more preferably 80 to 20%, further preferably 70 to 30 mol %, particularly preferably 60 to 40 mol % of the diamine residue represented by B and the remainder is a divalent residue B2.

Examples of an aromatic diamine component are as described below. Examples of an aromatic diamine component for introducing a residue B1, include 4,4'-diaminodiphenyl ether (44DADE), 3,4'-diaminodiphenyl ether (34DADE), 2,4'-diaminodiphenyl ether (24DADE), 3,3'-diaminodiphenyl ether (33DADE), 2,3'-diaminodiphenyl ether (23DADE) and 2,2'-diaminodiphenyl ether (22DADE). Among these, 4,4'-diaminodiphenyl ether (44DADE) and 3,4'-diaminodiphenyl ether (34DADE) are particularly preferable.

Examples of an aromatic diamine component for introducing a residue B2 include bis(aminophenoxy)benzenes having an Ar group represented by chemical formula (Ar1), bis(aminophenoxy)biphenyls having an Ar group represented by chemical formula (Ar2), bis[(aminophenoxy)phenyl]propanes having an Ar group represented by chemical formula (Ar3), bis[(aminophenoxy)phenyl]hexafluoropropanes having an Ar group represented by chemical formula (Ar4), bis[(aminophenoxy)phenyl]sulfones having an Ar group represented by chemical formula (Ar5) and bis(aminophenoxy) naphthalenes having an Ar group represented by chemical formula (Ar6).

Examples of a bis(aminophenoxy)benzene having an Ar group represented by chemical formula (Ar1) include 1,4-bis (4-aminophenoxy)benzene (TPEQ), 1,3-bis(4-aminophenoxy)benzene and 1,3-bis(3-aminophenoxy)benzene, particularly preferably 1,4-bis(4-aminophenoxy)benzene (TPEQ).

Examples of a bis(aminophenoxy)biphenyl having an Ar group represented by chemical formula (Ar2) include 4,4'-bis (4-aminophenoxy)biphenyl and 4,4'-bis(3-aminophenoxy) biphenyl, particularly preferably 4,4'-bis(4-aminophenoxy) biphenyl.

Examples of a bis[(aminophenoxy)phenyl]propane having an Ar group represented by chemical formula (Ar3) include 2,2-bis(4-aminophenoxy(4-phenyl))propane, 2,2-bis(3-aminophenoxy(4-phenyl))propane, 2,2-bis(4aminophenoxy(3-phenyl))propane and 2,2-bis(3-aminophenoxy(3-phenyl)) propane. Among these, 2,2-bis(4-aminophenoxy(4-phenyl)) propane is particularly preferable.

Examples of a bis[(aminophenoxy)phenyl]hexafluoropropane having an Ar group represented by chemical formula (Ar4) include 2,2-bis(4-aminophenoxy(4-phenyl))hexafluoropropane, 2,2-bis(3-aminophenoxy(4-phenyl))hexafluoropropane, 2,2-bis(4-aminophenoxy(3-phenyl))hexafluoropropane and 2,2-bis(3-aminophenoxy(3-phenyl)) hexafluoropropane. Among these, 2,2-bis(4-aminophenoxy (4-phenyl))hexafluoropropane is particularly preferable.

Examples of a bis[(aminophenoxy)phenyl]sulfone having an Ar group represented by chemical formula (Ar5) include bis[4-(4-aminophenoxy)phenyl]sulfone and bis[4-(3-aminophenoxy)phenyl]sulfone. Among these, bis[4-(4-aminophenoxy)phenyl]sulfone is particularly preferable.

Examples of a bis(aminophenoxy)naphthalene having an Ar group represented by chemical formula (Ar6) include 1,4-bis(4-aminophenoxy)naphthalene, 1,4-bis(3-aminophenoxy)naphthalene and 1,3-bis(4-aminophenoxy)naphthalene. Among these, 1,4-bis(4-aminophenoxy)naphthalene is preferable.

(Preparation of a Polyimide Solution)

A polyimide solution used for producing an asymmetric gas separation membrane of the present invention can be prepared by polymerizing/imidizing reaction of a tetracarboxylic acid component and a diamine component in substantially equal molar amounts in an organic solvent.

The polymerizing/imidizing reaction can be suitably conducted by a two-step method of combining a tetracarboxylic acid component and a diamine component in a predetermined compositional ratio in an organic solvent and polymerizing them at a low temperature of approximately room temperature to form a polyamide acid, followed by thermal imidization by heating at about 100 to 250° C., preferably about 130 to 200° C. or chemical imidization by adding pyridine, acetic anhydride or the like, or alternatively by a one-step method of combining a tetracarboxylic acid component and a diamine component in a predetermined compositional ratio in an organic solvent at a high temperature of about 100 to 250° C., preferably 130 to 200° C. for polymerization/imidization. In a thermal imidization reaction, the reaction is suitably conducted while removing water generated from elimination. The amounts of a tetracarboxylic acid component and a diamine component relative to an organic solvent is suitably used such that a polyimide concentration in the solvent becomes about 5 to 50% by weight, preferably 5 to 40% by weight.

There are no particular restrictions to an organic solvent for dissolving a polyimide as long as it can suitably dissolve an aromatic polyimide formed; suitable examples include phenols such as phenol, cresol and xylenol; catechols having two hydroxy groups directly bonded to a benzene ring such as catechol and resorcin; phenolic solvents including halogenated phenols such as 3-chlorophenol, 4-chlorophenol (identical to para-chlorophenol described later), 3-bromophenol, 4-bromophenol and 2-chloro-5-hydroxytoluene; amide solvents including amides such as N-methyl-2-pyrrolidone, N,N-dimethylformamide, N,N-diethylformamide, N,N-dimethylacetamide and N,N-diethylacetamide; and mixtures thereof.

A solution of a polyimide constituting a gas separation membrane used in the present invention can be a solution containing one polyimide or a blend solution of two or more polymers including a polyimide. The polymer is preferably a glassy polymer having a glass-transition temperature higher than a temperature $T_{OP}$ at which separating operation is conducted (preferably, $Tg > T_{OP}+50°$ C., more preferably $Tg > T_{OP}+100°$ C.).

(Structure of an Asymmetric Gas Separation Membrane)

An asymmetric gas separation membrane of the present invention is a separation membrane serially having an asymmetric structure comprising extremely thin dense layers (preferably having a thickness of 0.001 to 5 μm) which is mainly responsible for gas separation performance and a relatively thicker porous layer (preferably having a thickness of 10 to 2000 μm) supporting the dense layer. There are no particular restrictions to a shape of a separation membrane, but a hollow fiber membrane is preferable because it advantageously has a large effective surface area and high pressure resistance.

(Hollow Fiber Formation from a Polyimide Solution)

An asymmetric gas separation membrane of the present invention may be produced by a phase inversion method using the above polyimide solution. A phase inversion method is a known method, wherein the polymer solution is made to contact with a coagulation liquid for occurring phase inversion to form a membrane. In the present invention, a so-called dry/wet process is suitably employed. The dry/wet process is a process comprising evaporating a solvent in the surface of a polymer solution formed in a form of a membrane to form a thin dense layer and immersing the polymer into a coagulation liquid (a solvent miscible with the solvent of the polymer solution and incapable of dissolving the polymer) to form fine pores by using phase separation phenomenon occurring here so as to form a porous layer, which has been proposed by Loeb et al. (for example, U.S. Pat. No. 3,133, 132).

An asymmetric gas separation membrane of the present invention may be suitably produced as a hollow fiber membrane by employing a dry/wet spinning process. A dry/wet spinning process is a process for producing an asymmetric hollow fiber membrane by applying a dry/wet process to a polymer solution, to shape into a desired hollow fiber by discharge from a spinning nozzle. More specifically, it is a process for producing a separation membrane wherein a polymer solution is extruded into a desired hollow fiber shape from a nozzle, which is, immediately after extrusion, passed in the air or a nitrogen gas atmosphere, immersed into a coagulation liquid in which the polymer component is substantially insoluble and which is miscible with the solvent of the polymer mixture solution to form an asymmetric structure and then dried and, if necessary, heated. Any type of spinning nozzle capable of extruding a polyimide solution in a form of hollow fiber may be used, and preferably a tube-in-orifice type nozzle. Generally, a temperature range of a polyimide solution during extrusion is suitably about 20° C. to 150° C., particularly suitably 30° C. to 120° C. Furthermore, while spinning, a gas or liquid is fed into the inside of the hollow fiber material extruded from the nozzle.

In the present invention, for a polyimide solution extruded from a nozzle, a polyimide concentration is preferably 5 to 40% by weight, further preferably 8 to 25% by weight, and a solution viscosity (rotatory viscosity) at 100° C. is 300 to 20000 poise, preferably 500 to 15000 poise, particularly preferably 1000 to 10000 poise. For immersion in a solidification liquid, it is preferable that the material is immersed in a first coagulation liquid to be coagulated such that the form of the hollow fiber is maintained, wound up by a guide roll and then immersed in a secondary coagulation liquid for complete coagulation of the whole membrane. Suitable examples of a coagulation liquid include, but not limited to, water; lower alcohols such as methanol, ethanol and propyl alcohol; ketones having a lower alkyl group such as acetone, diethyl ketone and methyl ethyl ketone; and mixture thereof. For a method of drying coagulated membrane, replacing the coagulation liquid with a solvent such as hydrocarbons and then drying the membrane is efficient.

(Heating of an Asymmetric Gas Separation Membrane)

An asymmetric gas separation membrane of the present invention is characterized in that an asymmetric gas separation membrane produced by the above manufacturing process is heated at a temperature near a softening point ($T_s$) of a polyimide. In the present invention, a softening point of a polyimide is a temperature at an intersection point of tangent lines to a TMA curve before and after significant change in a thermal expansion coefficient (CTE), wherein the TMA curve is obtained by a thermo-mechanical analysis of the asymmetric gas separation membrane (which may be a hollow fiber membrane). A softening point of a polyimide is a temperature at which an elastic modulus of the polyimide constituting the asymmetric gas separation membrane is rapidly lowered, and it is often the case that the softening point of a polyimide is a critical temperature at which the asymmetric structure of asymmetric gas separation membrane is expected to be maintained.

A heating temperature ($T_{tr}$) of an asymmetric gas separation membrane is preferably $T_s-23°$ C. or higher, more preferably $T_s-20°$ C. or higher. It is preferably $T_s-2°$ C. or lower, further preferably $T_s-4°$ C. or lower. When the heating temperature ($T_{tr}$) is $T_s-23°$ C. or higher and $T_s-2°$ C. or lower, the asymmetric gas separation membrane is heat-fixed and thus satisfactory solvent resistance and satisfactory separation performance described later can be maintained for a long period.

If a heating temperature is too low, it is undesirable because contacting of an asymmetric gas separation membrane with a methanol-containing mixed organic vapor causes substantial swelling of the asymmetric gas separation membrane, leading to insufficient separation.

If a heating temperature is too high, the asymmetric structure of the gas separation membrane is not completely maintained and dense layers become thicker, so that an adequately high methanol permeation rate cannot be obtained.

A heating period is, but not limited to, preferably 0.01 hours or more and 10 hours or less, more preferably 0.1 hours or more and 2 hours or less.

An asymmetric gas separation membrane of the present invention has a methanol-vapor permeation rate ($P'_{MeOH}$) of preferably $4\times10^{-5}$ cm$^3$ (STP)/cm$^2$·sec·cmHg or more, more preferably $7\times10^{-5}$ cm$^3$ (STP)/cm$^2$·sec·cmHg or more and generally $100\times10^{-4}$ cm$^3$ (STP)/cm$^2$·sec·cmHg or less. Furthermore, a ratio of a permeation rate of methanol vapor to a permeation rate of dimethyl carbonate vapor ($P'_{MeOH}/P'_{DMC}$) is preferably 8 or more, more preferably 10 or more and generally 200 or less. An asymmetric gas separation membrane having a large methanol-vapor permeation rate and preferably a large ratio of a permeation rate of methanol vapor to a permeation rate of dimethyl carbonate vapor as described above has practically satisfactory separation performance for making methanol selectively permeating from a methanol-containing mixed organic vapor.

In the present invention, a methanol-vapor permeation rate ($P'_{MeOH}$), and a ratio of a permeation rate of methanol vapor to a permeation rate of dimethyl carbonate vapor ($P'_{MeOH}/P'_{DMC}$) can be, for example, calculated from the results obtained by measurement for a membrane where a mixed organic vapor in which a weight ratio of methanol vapor to dimethyl carbonate vapor is 6:4 and which is at 120° C. and 0.2 MPaG is fed to a hollow side of the asymmetric hollow fiber membrane while the permeate side of the hollow fiber membrane is vacuumed to 10 mmHg.

An asymmetric gas separation membrane of the present invention has excellent solvent resistance (resistance to an organic compound). It has, for example, excellent resistance to aromatic hydrocarbons such as toluene, o-xylene, m-xylene, p-xylene, ethylbenzene and cumene; aliphatic alcohols such as methanol, ethanol, n-propanol, isopropanol, n-butanol, sec-butanol, tert-butanol and ethylene glycol; alicyclic alcohols such as cyclohexanol; aromatic alcohols such as benzyl alcohol; organic carboxylic acids such as formic acid, acetic acid, propionic acid and butyric acid; esters such as methyl acetate, ethyl acetate, methyl acrylate, ethyl acrylate, methyl metacrylate and ethyl metacrylate; carbonates such as dimethyl carbonate, diethyl carbonate and methyl ethyl carbonate; ketones such as acetone and methyl ethyl ketone; cyclic ethers such as tetrahydrofuran and dioxane; and organic amines such as dibutylamine and aniline.

An asymmetric gas separation membrane of the present invention can maintain separation performance and solvent resistance described above and be still usable even after long-term use (for example, preferably 100 hours or more, more preferably 1000 hours or more).

An asymmetric gas separation membrane of the present invention can be used as a module. For example, a module has a configuration that, in a vessel equipped with at least a mixed gas inlet, a permeate gas outlet and an non-permeate gas outlet, an asymmetric gas separation membrane is placed in such a manner that a permeate side and an non-permeate side of the gas separation membrane are separated. When hollow fiber membranes constitute a module, generally a plurality of hollow fiber membranes (for example, several hundreds to several hundred thousands) are bound together to be a hollow fiber bundle, and at least one end part of the hollow fiber bundle is bound by a hardening resin such as an epoxy resin or a thermoplastic resin such as a polyamide resin while the end part of the hollow fiber is kept to be open (the resin binding part is called as a tube sheet) to form a hollow fiber separation membrane element, and furthermore, one or more of the hollow fiber separation membrane elements are mounted in a vessel that is equipped with at least a gas inlet, a permeate gas outlet and an non-permeate gas outlet, in such a manner that the space connected to the internal side of the hollow-fiber is isolated from the space connected to the external side of the hollow-fiber. The vessel is made of a metal material such as stainless steel, a plastic material or a composite material such as a fiber reinforced plastic material. The gas separation membrane module described above may further have a carrier gas inlet communicated with the permeate side of the gas separation membrane. Furthermore, the module may be either a so-called bore feed type or a shell feed type.

FIG. 1 is a schematic cross-sectional drawing showing an example of the gas separation membrane module for organic vapor separation which can be used in the present invention, wherein the gas separation membrane module has a core tube for supplying carrier gas in an approximately center part of a fiber bundle and has a carrier gas guide film covering a circumferential part of the fiber bundle. In the gas separation membrane module shown in FIG. 1, the outer frame is comprised of cylindrical vessel 5 having mixed gas inlet 1, carrier gas inlet 2, permeate gas outlet 3 and non-permeate gas outlet 4; and in the cylindrical vessel 5 is accommodated the fiber bundle 6 formed by bundling multiple hollow fiber membranes 6a having selective permeability as the hollow fiber element having the following configuration. That is to say, the fiber bundle 6 is each fixed with the second tube sheet 7b consisting of the cured material of the epoxy resin composition at the end part on the side of the permeate gas outlet 3 in the figure, and with the first tube sheet 7a consisting of the cured material of the epoxy composition at the end part on the side of the non-permeate gas outlet 4 in the figure to form the hollow fiber element as a whole. In the hollow fiber element, hollow fiber membranes 6a forming the hollow fiber bundle 6 penetrate the tube sheets 7a and 7b at each side and fixed therewith, while keeping the hollows in open state. In addition, the circumferential part of the hollow fiber bundle 6 is covered with the carrier gas guide film 8 through the positions from where the carrier gas is introduced to where the carrier gas is discharged. In addition, is equipped the core tube 9 that penetrates the tube sheet 7a, which is arranged at the approximately center part of the hollow fiber bundle 6, along the hollow fiber bundle. The connecting hole 10 connecting the internal space of the core tube and the hollow fiber bundle is formed on the core tube at the position near the tube sheet 7a on the side where the carrier gas is introduced.

There will be described a process for separating methanol from a methanol-containing mixed organic vapor using the asymmetric gas separation membrane described above.

The methanol-containing mixed organic vapor may be produced by any method, but it can be generally produced by vaporizing an organic compound mixture solution containing methanol by heating it at a temperature higher than the boiling point of the organic compound or an azeotropic point.

An organic compound to be the organic vapor can be a liquid organic compound having a boiling point of preferably 0° C. or higher and 200° C. or lower, more preferably 0° C. or higher and 150° C. or lower, and particularly preferably an organic compound which is liquid at an ambient temperature (25° C.). The use of an organic compound having a boiling point of 0° C. or higher and 200° C. or lower is practically advantageous in the light of an operating temperature range, a facility for superheating an organic vapor mixture, a facility for condensing and recovering a purified/separated component and ease in handling.

Such an organic compound may be an organic compound mixture of methanol with, for example, one or more selected from the group consisting of aromatic hydrocarbons such as toluene, o-xylene, m-xylene, p-xylene, ethylbenzene and cumene aliphatic alcohols such as ethanol, n-propanol, iso-propanol, n-butanol, sec-butanol, tert-butanol and ethylene glycol; alicyclic alcohols such as cyclohexanol; aromatic alcohols such as benzyl alcohol; organic carboxylic acids such as formic acid, acetic acid, propionic acid and butyric acid; esters such as methyl acetate, ethyl acetate, methyl acrylate, ethyl acrylate, methyl metacrylate and ethyl metacrylate; carbonates such as dimethyl carbonate, diethyl carbonate and methyl ethyl carbonate; ketones such as acetone and methyl ethyl ketone; cyclic ethers such as tetrahydrofuran and dioxane; and organic amines such as dibutylamine and aniline.

In a gas separation process of the present invention, a methanol-containing mixed organic vapor is made in contact with one side of a gas separation membrane of the present invention at a temperature of preferably 110° C. or higher and 250° C. or lower, more preferably 115° C. or higher and 200° C. or lower, further preferably 120° C. or higher and 150° C. or lower.

If a temperature of the mixed organic vapor is too low, the amount of a mixed organic vapor dissolved in a polyimide constituting an asymmetric gas separation membrane increases, disadvantageously leading to increase in plasticization and swelling of the polyimide, and thus a permselectivity of methanol from the mixed organic vapor becomes poor. If a temperature of the mixed organic vapor is too high, the mixed organic vapor during separation operation may be subjected to a chemical reaction, disadvantageously leading to deterioration in quality of a recovered organic solvent.

In the present invention, methanol is a high permeating component among gases contained in a mixed organic vapor. It is preferable to ensure a partial pressure difference between the feeding side and the permeate side of the asymmetric gas separation membrane by, for example, keeping a pressure of the permeate side of the gas separation membrane at a reduced level. More preferably, a pressure of the permeate side is controlled to be a reduced pressure of 1 to 500 mmHg. Keeping the permeate side of the gas separation membrane at a reduced pressure allows methanol to selectively permeate as fast as possible, which facilitates selective removal of methanol from an organic vapor mixture as a source gas fed to the feeding side of the gas separation membrane. In such a case, the larger a degree of pressure reduction is, the more the vapor permeates.

A partial pressure difference between the feeding side and the permeate side of the gas separation membrane can be ensured by keeping a pressure of the feeding side at a high pressure or by feeding a dry gas as a carrier gas to the permeate side in place of keeping the permeate side at a reduced pressure. There are no particular restrictions to the method, and two or more methods can be concurrently combined.

A gas separation process of the present invention may be conducted at a normal pressure or an elevated pressure of an organic vapor mixture fed to a gas separation membrane. Preferably, an organic vapor mixture is fed to the gas separation membrane at 0.3 MPaG pressurized from 0 MPaG. If a pressure of the feeding side is lower than 0 MPaG, a partial pressure difference of methanol as a high permeation component between the feeding side and the permeate side of the gas separation membrane cannot be sufficiently ensured, disadvantageously leading to reduction of permeating methanol.

If a pressure of the feeding side is higher than 0.3 MPaG, the amount of an organic vapor dissolved in the polyimide which constitutes an asymmetric gas separation membrane increases, disadvantageously leading to significant plasticization and swelling of the asymmetric gas separation membrane, and thus, sufficient separation performance may not be obtained.

A mixed organic vapor is generated by vaporizing a liquid mixture containing an organic-compound such as the organic compound solution described above by heating using an evaporator (distillator) and is preferably fed to an asymmetric gas separation membrane (a gas inlet when a gas separation membrane module is used) of the present invention as a pressurized organic vapor mixture at a pressure of 0 MPaG (ambient pressure) to 0.3 MPaG. A pressurized organic vapor mixture may be obtained by directly pressurizing with a pressure type evaporator, or by pressurizing with a vapor compressor an organic vapor mixture in an ambient pressure state which has been obtained from an atmospheric evaporator.

In a gas separation process of the present invention, it is suitable to conduct gas separation while feeding a dry gas as a carrier gas to the permeate side of the gas separation membrane because selective removal of methanol as a higher permeating component can be facilitated. There are no particular restrictions to the carrier gas as long as it does not contain methanol or it contains methanol at a lower partial pressure than that in a non-permeate gas, and, for example, nitrogen and the air may be used. Nitrogen is a preferable carrier gas in the light of accident prevention because reverse permeation from the space of the permeate side to the space of the feeding side is not tend to occur and it is inert. Alternatively, it is also suitable that a part of a non-permeate gas from which methanol has been separated is recycled to a carrier gas inlet and used as a carrier gas.

There will be explained an example of the method for separating the organic vapor mixture using the separation membrane module shown in FIG. 1. The organic vapor mixture is preferably superheated and introduced from the mixed gas inlet 1 into the internal space of the hollow fiber membrane 6a through the aperture of the hollow fiber membrane. While the organic vapor mixture flows through the internal space of the hollow fiber membrane, the permeate vapor containing the higher permeable component (methanol) selectively permeates and moves to the space where the hollow fiber bundle is housed between the tube sheets 7a and 7b. The non-permeate vapor which has not permeated is discharged from the non-permeate gas outlet 4 through the space which another aperture of the hollow fiber membrane faces. The carrier gas is introduced from the carrier gas inlet 2 of the core tube 9, introduced from the connecting hole 10 of the core tube 9 to the space where the hollow fiber is mounted between the tube sheets 7a and 7b, and flows with contacting the outside of the hollow fiber membranes 6a, and discharged from the permeate gas outlet 3 together with the permeate gas from the hollow fiber membrane. Therefore, the flows of the organic vapor mixture and carrier gas are countercurrent in the module on both sides sandwiching the separation membrane. In addition, the partial pressure of the higher permeable component is controlled such that it is lower on the permeate side than that on the supply side.

EXAMPLES

Measurement and evaluation in each example described below were conducted as follows.
(Method for Measuring the Softening Temperature of the Polyimide using a Thermomechanical Analyzer)

It is measured by a tensile loading method (load: 5 g) under the conditions of a temperature-rise rate of 5° C./min and a measuring temperature range of 25 to 400° C. under an atmosphere of nitrogen using a thermomechanical analyzer (Thermo plus EVO TMA8310 made by Rigaku Corporation). On the obtained TMA curve, the tangent lines were drawn to the curve before and after a significant change in the coefficient of thermal expansion (CTE), and the softening point of the polyimide was given by the temperature at the intersection point of the tangent lines.

(Measurement of Gas Separation Performance for a Mixed Vapor)

Preparation of a measurement module: ten hollow fiber membranes were bundled and cut to form a hollow fiber membrane bundle, and both end parts of the fiber bundle were fixed with an epoxy resin such that the ends of the hollow fibers were open, to form a hollow fiber membrane element. This hollow fiber membrane bundle element was mounted in a vessel which has a source mixed vapor inlet, a permeate gas outlet and a non-permeate gas outlet, to produce a module for measuring gas separation performance wherein the hollow fiber membrane has an effective length of 11 cm and an effective membrane area of 15 cm$^2$.

Preparation of a mixed organic vapor: a mixed solution containing methanol and an organic compound was completely vaporized by heating using an evaporator under an atmospheric pressure to generate a mixed organic vapor. Furthermore, the mixed organic vapor was superheated by a heater to generate a mixed organic vapor at a predetermined pressure and a predetermined temperature. Concentrations of individual components in the mixed organic vapor were controlled by concentration in the mixed solution fed to the evaporator.

Measurement of gas separation performance: measurement was initiated by feeding the mixed organic vapor prepared as described above from the mixed vapor inlet of the measurement module. During the measurement, the permeate side of the hollow fiber membrane was kept at a reduced pressure of 10 mmHg. After 60 min or more from measurement initiation, a permeate gas obtained from the permeate gas outlet in the measurement module was guided to a dry-ice/methanol trap for 15 min to collect a condensate. The collected condensate was weighed and a concentration was measured by gas chromatographic analysis, to calculate permeation rates (P's) of organic compounds. From a permeation rate of each organic compound, a ratio of permeation rate was calculated.

Production Example 1

(Preparation of a Polyimide Solution)

In a separable flask equipped with a heater, a stirrer, a nitrogen inlet tube and a discharge tube, a tetracarboxylic acid component consisting of 28.9 g of 3,3',4,4'-biphenyl tetracarboxylic dianhydride (s-BPDA) and a diamine component consisting of 4.0 g of 3,4'-diaminodiphenyl ether (34DADE), 4.0 g of 4,4'-diaminodiphenyl ether (44DADE) and 17.5 g of 1,4-bis(4-aminophenoxy)benzene (TPEQ) were placed along with 248 g of para-chlorophenol (PCP), and the mixture was polymerized at 190° C. for 10 hours with stirring under a nitrogen gas atmosphere, to prepare an aromatic polyimide solution (A) in which a solid content concentration of polyimide (dope concentration) in PCP is 17% by weight. The aromatic polyimide solution (A) has a viscosity of 2000 poise at 100° C. The solution viscosity was measured at a temperature of 100° C. using a rotatory viscometer (a shear rate of the rotor: 1.75 sec$^{-1}$).

(Producing an Asymmetric Hollow Fiber Membrane Made of an Aromatic Polyimide)

The aromatic polyimide solution (A) was filtered through a 400 mesh stainless steel woven metal to give a spinning dope. This dope was charged in a spinning apparatus equipped with a hollow fiber spinning nozzle, and extruded from the hollow fiber spinning nozzle as hollow fibers in a nitrogen atmosphere, and then, the above hollow fiber molded material was immersed in a solidification bath and wound up by a bobbin as a wet asymmetric hollow fiber membrane. This asymmetric hollow fiber membrane was thoroughly washed with ethanol and dried to produce an asymmetric hollow fiber membrane.

The asymmetric hollow fiber membrane thus obtained was heated at 240° C. for 30 min to provide an asymmetric hollow fiber membrane 1 (outer diameter: about 500 μm, inner diameter: about 300 μm) made of the aromatic polyimide.

Production Examples 2 to 5 and 7 to 10

An asymmetric hollow fiber membrane was produced as described in Production Example 1, except that a tetracarboxylic acid component and a diamine component shown in Table 1 were used and heating was conducted at a heating temperature ($T_{tr}$) shown in Table 1.

PCP were polymerized at a polymerization temperature of 180° C. for 12 hours to give a polyimide solution (b) with a viscosity of 1674 poise and a polyimide solid content concentration of 16% by weight in PCP.

(Preparation of a Polyimide Mixture Solution (c))

In a separable flask, the polyimide solution (a) and the polyimide solution (b) were stirred at 130° C. for 3 hours to prepare a polyimide mixture solution (c). The mixture solution had a polyimide solid content concentration of 16% by weight and a viscosity of 1786 poise.

An asymmetric hollow fiber membrane 6 was produced as described in Production Example 1, except that the polyimide mixture solution (c) was used and a heating temperature ($T_{tr}$) was 275° C.

TABLE 1

| | Hollow fiber | Polyimide solution | | | | | | |
|---|---|---|---|---|---|---|---|---|
| | | Tetracarboxylic acid component (g) | Diamine component (g) | PCP (g) | Concentration (% by weight) | $T_s$ (° C.) | $T_{tr}$ (° C.) | $T_s - T_{tr}$ (° C.) |
| Production Example 1 | 1 | s-BPDA (28.9 g) | 34DADE (4.0 g) | 248 | 17 | 245 | 240 | 5 |
| Production Example 2 | 2 | | 44DADE (4.0 g) | | | | 230 | 15 |
| Production Example 3 | 3 | | TPEQ (17.5 g) | | | | 220 | 25 |
| Production Example 4 | 4 | | | | | | 250 | −5 |
| Production Example 5 | 5 | S-BPDA (23.4 g) | 44DADE (6.5 g) TPEQ (14.3 g) | 202 | 17 | 254 | 237 | 17 |
| Production Example 6 | 6 | s-BPDA (10.2 g) s-BPDA (14.1 g) 6FDA (14.2 g) | 44DADE (7.1 g) 44DADE (16.3 g) | 84 218 | 16 | 285 | 275 | 10 |
| Production Example 7 | 7 | S-BPDA (17.4 g) | 34DADE (3.6 g) | 198 | 17 | 250 | 215 | 35 |
| Production Example 8 | 8 | | 44DADE (3.6 g) | | | | 235 | 15 |
| Production Example 9 | 9 | | BAPP (9.9 g) | | | | 245 | 5 |
| Production Example 10 | 10 | | | | | | 255 | −5 |

$T_s$ represents a softening point of a polyimide;
$T_{tr}$ represents a heating temperature of an asymmetric hollow fiber membrane.

Table 1 shows a softening point ($T_s$), a heating temperature ($T_{tr}$) for an asymmetric hollow fiber membrane and $T_s-T_{tr}$ of each polyimide.

Production Example 6

(Preparation of a Polyimide Solution (a))

In a separable flask, along with 84 g of PCP, a tetracarboxylic acid component consisting of 10.2 g of s-BPDA and a diamine component consisting of 7.1 g of 44DADE were polymerized at a polymerization temperature of 180° C. for 10 hours to give a polyimide solution (a) with a viscosity of 1730 poise and a polyimide solid content concentration of 16% by weight in PCP.

(Preparation of a Polyimide Solution (b))

In a separable flask, a tetracarboxylic acid component consisting of 14.1 g of s-BPDA and 14.2 g of 2,2-bis(3,4-dicarboxyphenyl)hexafluoropropane dianhydride (6FDA) and a diamine component of 16.3 g of 44DADE along with 218 g of Example 1

For the asymmetric hollow fiber membrane 1 produced in Production Example 1, a mixed organic vapor consisting of methanol and dimethyl carbonate (a weight ratio of methanol to dimethyl carbonate was 60:40) at 120° C. and 0.2 MPaG was prepared and used for measuring permeation rates of methanol and dimethyl carbonate. A permeation rate ($P'_{MeOH}$) of methanol vapor was $8.5 \times 10^{-5}$ cm$^3$ (STP)/cm$^2 \cdot$sec$\cdot$cmHg, and a permselectivity of methanol vapor to dimethyl carbonate vapor ($P'_{MeOH}/P'_{DMC}$) was 14.6.

Examples 2 to 9 and Comparative Examples 1 to 6

As described in Example 1, a mixed organic vapor consisting of methanol and dimethyl carbonate at a temperature and a pressure shown in Table 2 was prepared using an asymmetric hollow fiber membrane shown in Table 2, and a permeation rate (P'$_{MeOH}$) of methanol vapor and a permeation rate of dimethyl carbonate were measured. The results are shown in Table 2.

TABLE 2

| Hollow fiber membrane | Mixed organic vapor | | | |
|---|---|---|---|---|
| | Feeding pressure (MPaG) | Membrane temperature (° C.) | Permeation rate*[1] P'$_{MeOH}$ | Permselectivity*[2] |
| Example 1 | 1 | 0.20 | 120 | 8.5 | 14.6 |
| Example 2 | 1 | 0.30 | 120 | 12.0 | 9.2 |
| Example 3 | 2 | 0.20 | 120 | 10.4 | 10.3 |
| Example 4 | 5 | 0.20 | 130 | 9.3 | 15.6 |
| Example 5 | 5 | 0.20 | 120 | 8.7 | 15.8 |
| Example 6 | 5 | 0.20 | 110 | 9.4 | 15.3 |
| Example 7 | 6 | 0.20 | 120 | 12.6 | 9.9 |
| Example 8 | 8 | 0.20 | 120 | 14.7 | 8.8 |
| Example 9 | 9 | 0.20 | 120 | 12.9 | 12.2 |
| Comparative Example 1 | 1 | 0.35 | 120 | 29.4 | 3.2 |
| Comparative Example 2 | 3 | 0.20 | 120 | 37.6 | 3.9 |
| Comparative Example 3 | 4 | 0.20 | 120 | 1.3 | 19.1 |
| Comparative Example 4 | 5 | 0.20 | 100 | 13.7 | 7.8 |
| Comparative Example 5 | 7 | 0.20 | 120 | 38 | 4.8 |
| Comparative Example 6 | 10 | 0.20 | 120 | 1.3 | 18.2 |

*[1]The unit of a permeation rate (P') is [×10$^{-5}$ cm$^3$(STP)/cm$^2$ · sec · cmHg].
*[2]A permselectivity is a ratio of a methanol vapor permeation rate to a dimethyl carbonate vapor permeation rate (P'$_{MeOH}$/P'$_{DMC}$).

Example 10

For the asymmetric hollow fiber membrane 5 produced in Production Example 5, a mixed organic vapor consisting of methanol and methyl acetate (a weight ratio of methanol to methyl acetate was 20:80) at 120° C. and 0.2 MPaG was prepared and used for measuring permeation rates of methanol and methyl acetate. A permeation rate (P'$_{MeOH}$) of methanol vapor was 8.2×10$^{-5}$ cm$^3$ (STP)/cm$^2$·sec·cmHg, and a permselectivity of methanol vapor to methyl acetate vapor (P'$_{MeOH}$/P'$_{methyl\ acetate}$) was 31.8.

Example 11

For the asymmetric hollow fiber membrane 5 produced in Production Example 5, a mixed organic vapor consisting of methanol and toluene (a weight ratio of methanol to toluene was 70:30) at 120° C. and 0.2 MPaG was prepared and used for measuring permeation rates of methanol and toluene. A permeation rate (P'$_{MeOH}$) of methanol vapor was 11.5×10$^{-5}$ cm$^3$ (STP)/cm$^2$·sec·cmHg, and a permselectivity of methanol vapor to toluene vapor (P'$_{MeOH}$/P'$_{toluene}$) was 57.3.

Example 12

For the asymmetric hollow fiber membrane 5 produced in Production Example 5, a mixed organic vapor consisting of methanol and dimethyl carbonate (a weight ratio of methanol to dimethyl carbonate was 60:40) at 120° C. and 0.1 MPaG was prepared and fed to the asymmetric hollow fiber membrane. Then, 315 hours after the initiation of the experiment, a permeation rate of methanol vapor (P'$_{MeOH}$) was 7.7×10$^{-5}$ cm$^3$ (STP)/cm$^2$·sec·cmHg and a permselectivity of methanol vapor to dimethyl carbonate vapor (P'$_{MeOH}$/P'$_{DMC}$) was 16.2. Even after 300 hours or more elapsed, separation and permeation performance was satisfactory.

Example 13

For the asymmetric hollow fiber membrane 5 produced in Production Example 5, a mixed organic vapor consisting of methanol and tetrahydrofuran (THF) (a weight ratio of methanol to tetrahydrofuran was 60:40) at 120° C. and 0.1 MPaG was prepared and used for measuring permeation rates of methanol and tetrahydrofuran. A permeation rate (P'$_{MeOH}$) of methanol vapor was 7.6×10$^{-5}$ cm$^3$ (STP)/cm$^2$·sec·cmHg, and a permselectivity of methanol vapor to tetrahydrofuran vapor (P'$_{MeOH}$/P'$_{THF}$) was 302.

INDUSTRIAL USABILITY

The present invention relates to a gas separation membrane particularly improved in a permeation rate of methanol vapor and a permselectivity of methanol vapor from a mixed organic vapor produced by heating an asymmetric gas separation membrane mainly made of a polyimide containing repeating units having an ether bond at a temperature near a softening point of the polyimide. Furthermore, gas separation using the asymmetric gas separation membrane allows a methanol-containing mixed vapor to be easily and efficiently separated consistently for a long period.

The invention claimed is:
1. An asymmetric gas separation membrane produced by heating an asymmetric gas separation membrane made of a polyimide substantially consisting of repeating units represented by the following general formula (1) at a temperature of T$_{tr}$ within the range:

$(T_s-23°\ C.)<T_{tr}<(T_s-2°\ C.)$ wherein T$_{tr}$ represents a heating temperature and T$_s$ represents a softening point of the polyimide constituting the asymmetric gas separation membrane;
wherein a permeation rate of methanol vapor (P'$_{MeOH}$) is 4×10$^{-5}$ cm$^3$ (STP)/cm$^2$·sec·cmHg or more;
a ratio of a permeation rate of methanol vapor to a permeation rate of dimethyl carbonate vapor (P'$_{MeOH}$/P'$_{DMC}$) is 8 or more; and General formula (1)

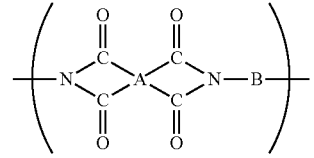

the polyimide has a softening point of 245° C. or higher,
wherein in general formula (1), A represents a tetravalent residue having an aromatic ring,
wherein 60 to 100 mol % of the tetravalent residue having an aromatic ring represented by A in general formula (1) is a tetravalent residue based on a biphenyl structure represented by chemical formula (A1)

Chemical formula (A1)

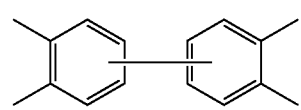

and
in general formula (1), B mainly represents a divalent residue represented by the following chemical formula (B1) and/or a divalent residue represented by the following chemical formula (B2):

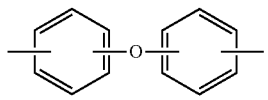
Chemical formula (B1)

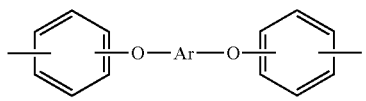
Chemical formula (B2)

wherein in chemical formula (B2), Ar represents one or more divalent residues selected from the group consisting of the residues represented by chemical formulas (Ar1) to (Ar6)

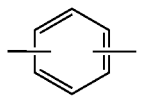
Chemical formula (Ar1)

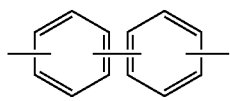
Chemical formula (Ar2)

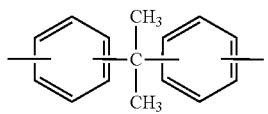
Chemical formula (Ar3)

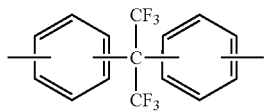
Chemical formula (Ar4)

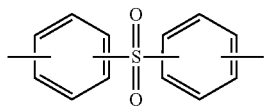
Chemical formula (Ar5)

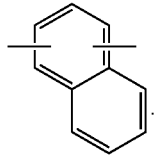
Chemical formula (Ar6)

2. The asymmetric gas separation membrane according to claim 1, wherein said asymmetric gas separation membrane is a hollow fiber membrane.

3. A process for manufacturing an asymmetric gas separation membrane, comprising heating an asymmetric gas separation membrane comprising a polyimide having repeating units represented by the following general formula (1) at a temperature of $T_{tr}$ within the range:

$$(T_s - 23° C.) < T_{tr} < (T_s - 2° C.)$$

wherein $T_{tr}$ represents a heating temperature and $T_s$ represents a softening point of the polyimide, wherein the polyimide has a softening point of 245° C. or higher,

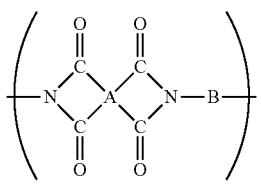
General formula (1)

wherein in general formula (1), A represents a tetravalent residue having an aromatic ring, wherein 60 to 100 mol % of the tetravalent residue having an aromatic ring represented by A in general formula (1) is a tetravalent residue based on a biphenyl structure represented by chemical formula (A1)

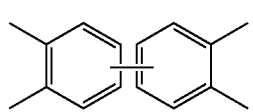
Chemical formula (A1)

and in general formula (1), B mainly represents a divalent residue represented by the following chemical formula (B1) and/or a divalent residue represented by the following chemical formula (B2):

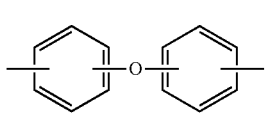
Chemical formula (B1)

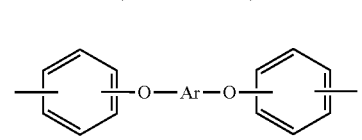
Chemical formula (B2)

wherein in chemical formula (B2), Ar represents one or more divalent residues selected from the group consisting of the residues represented by chemical formulas (Ar1) to (Ar6)

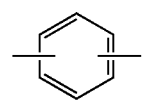
Chemical formula (Ar1)

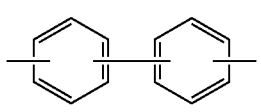
Chemical formula (Ar2)

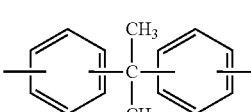
Chemical formula (Ar3)

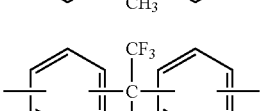
Chemical formula (Ar4)

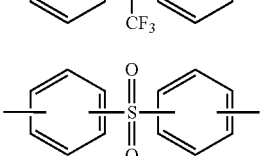
Chemical formula (Ar5)

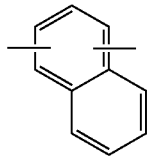

Chemical formula (Ar6)

4. A process for separating methanol from a methanol-containing mixed organic vapor, comprising:
heating a methanol-containing mixed organic solvent at a temperature of 110° C. or more and 250° C. or less and a pressure of 0 MPaG or more and 0.3 MPaG or less to generate a mixed organic vapor; and
contacting the asymmetric gas separation membrane according to claim 1 with said mixed organic vapor, thereby allowing methanol vapor to selectively permeate said asymmetric gas separation membrane.

5. The process according to claim 4 wherein said mixed organic vapor comprises methanol and dimethyl carbonate.

* * * * *

UNITED STATES PATENT AND TRADEMARK OFFICE
CERTIFICATE OF CORRECTION

PATENT NO. : 9,211,497 B2
APPLICATION NO. : 13/992600
DATED : December 15, 2015
INVENTOR(S) : Takada et al.

It is certified that error appears in the above-identified patent and that said Letters Patent is hereby corrected as shown below:

In the specification
Col. 5, line 67, reads "tetracarboxylte" should read --tetracarboxylate--.
Col. 7, line 22, reads "2,2-bis(4aminophenoxy" should read --2,2-bis(4-aminophenoxy--.
Col. 10, line 35, reads "metacrylate" should read --methacrylate--.
Col. 10, line 35, reads "metacrylate;" should read --methacrylate;--.
Col. 11, line 63, reads "cumene" should read --cumene;--.
Col. 12, line 2, reads "metacrylate" should read --methacrylate--.
Col. 12, line 3, reads "metacrylate;" should read --methacrylate;--.

Signed and Sealed this
Nineteenth Day of July, 2016

Michelle K. Lee
*Director of the United States Patent and Trademark Office*